though the gap is proper, each discharge across the gap will erode from the workpiece 12 a particle that will be washed away from the gap area by the dielectric fluid.

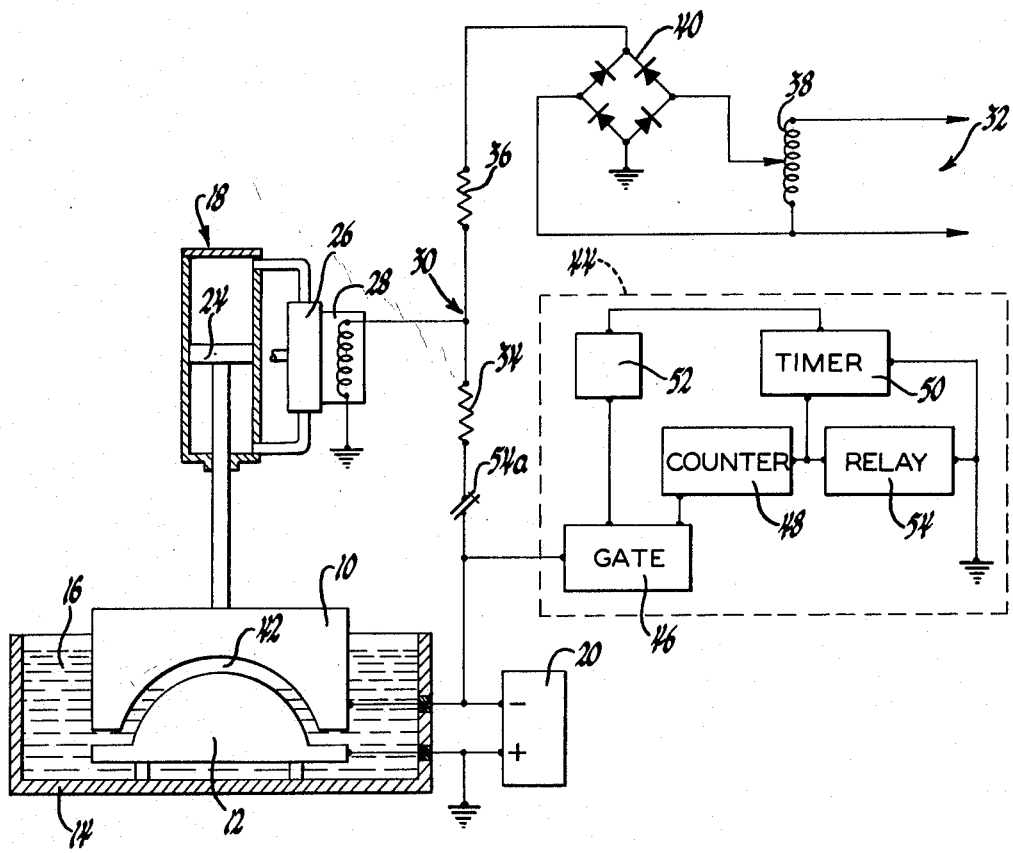

United States Patent Office 3,128,364
Patented Apr. 7, 1964

3,128,364
ELECTRICAL STOCK REMOVAL APPARATUS
Glenn E. Wanttaja, Hales Corners, Wis., and August F. Scarpelli, Warren, and Thomas T. Stapleton, Clawson, Mich., assignors to General Motors Corporation, Detroit, Mich., a corporation of Delaware
Filed Aug. 16, 1960, Ser. No. 49,867
11 Claims. (Cl. 219—69)

This invention relates to the improvements in electrical discharge machining apparatus.

In the electrical discharge machining process, a feed mechanism is usually employed to maintain a certain gap between cutting tool and workpiece electrodes. An ionizable medium, such as a dielectric fluid, is pumped through the gap during the machining operation and functions both as a coolant and as a mode of flushing eroded stock particles from the gap vicinity thereby facilitating more stable cutting. When employing this process to machine complex shapes, gas formations frequently develop between the electrodes and/or eroded material accumulates in the gap area and interfere with the flushing action to an extent that the operation of the feed mechanism becomes very unstable. In the case of gas formations, they can, as well as cause an accumulation of eroded material, produce pressure build-ups, which can alone cause instability. The result in each instance is lost machining time and often the finish on the workpiece is impaired.

It is accordingly an aim of this invention to detect these gaseous formations and/or these accumulations of eroded material and, when discovered, cause a cessation of the machining operation long enough to permit the undesired condition to dissipate. More specifically, the invention contemplates the provision of novel circuitry that senses fluctuations across the gap, and, when these fluctuations are above a certain frequency thus indicating the presence of the gaseous formation and/or the accumulation of eroded material, the novel circuitry will cause the electrodes to be separated for an interval adequate for the condition to be eliminated. Thereafter, the machining operation is automatically resumed.

Also, the invention seeks to furnish a unique detection system that counts gap voltage fluctuations for predetermined intervals. If these fluctuations exceed a certain frequency, a timing network will be caused to interrupt the machining operation for a preset time interval, this interval being adequate for the condition indicated by the excessive fluctuations to be dissipated.

The foregoing and other objects and advantages of the invention will become apparent from the following description and the accompanying drawing in which an embodiment of the invention is shown schematically.

Referring to the drawing in detail, the numerals 10 and 12 denote, respectively, a cutting tool and a workpiece. The cutting tool 10 and the workpiece 12 each perform as an electrode with the cutting tool 10 being, for example and without limitation, the cathode and the workpiece the anode. If preferred, these polarities may be reversed so that the cutting tool 10 becomes the anode and the workpiece 12 the electrode. The workpiece 12 is mounted within and insulated from a container 14 filled with an ionizable medium such as some appropriate dielectric fluid 16, whereas the cutting tool 10 is maneuvered relative to the workpiece 12 by a feed mechanism 18.

Energy is supplied to the gap provided between the cutting tool 10 and the workpiece 12 by a suitable power supply 20. This energy, as is understood by those versed in the art, produces time spaced discharges along an ionized path through the dielectric fluid between the cutting tool 10 and the workpiece 12. Assuming that the spacing of the gap is proper, each discharge across the gap will erode from the workpiece 12 a particle that will be washed away from the gap area by the dielectric fluid.

The feed mechanism 18 may be of any suitable type, e.g., a hydraulic servo motor of the piston type depicted and disclosed in the Patent 3,059,150 to Colten et al., or any other kind of motor may be employed to maneuver the tool 10 either directly or indirectly as through appropriate gearing. In this embodiment, the former is employed and, as depicted, includes a cylinder housed piston 24, the opposite ends of which are supplied with pressure fluid under the control of a servo valve 26. The servo valve 26 is in turn controlled by a force motor 28, both the servo valve 26 and the force motor 28 being described in detail in the mentioned earlier application.

Since the voltage across the gap is proportional to the gap spacing, it is preferred to use gap voltage as a control for the feed mechanism 18. To accomplish this, a summing circuit denoted generally at 30 is connected both across the gap and to a reference voltage source denoted at 32, respectively, through impedances 34 and 36 selected to provide the desired voltage characteristics. The reference voltage may be derived from a 115 volt A.C. line and then stepped down by a transformer 38 and made unilateral by a full-wave rectifier 40. Consequently, a D.C. reference voltage, for exemplary purposes of a positive 40 volts, will be applied to the summing circuit 30. The 40-volt reference will be compared by the summing circuit 30 with the gap voltage applied thereto, which will be negative with the polarities assumed, and if also 40 volts then no error or control signal will be supplied to the force motor 28. This null signal indicates that the gap spacing is that desired and, hence, the feed mechanism 18 will not change the gap spacing. But if the gap spacing should be less than wanted, or a short occur, the gap voltage will likewise reduce with the result that the reference voltage will dominate and a positive error signal will be sensed by the force motor 28. A positive error signal in this embodiment will cause the feed mechanism 18 to separate the cutting tool 10 and the workpiece 12 further so as to increase the gap spacing. On the other hand, if the gap spacing is too great, the gap voltage will be greater than the reference voltage. This situation will produce a negative error signal and, when applied to the force motor 28, will cause the feed mechanism 18 to move the cutting tool 10 closer to the workpiece 12.

It is possible during the machining operation for one or more gaseous formations as pocket 42 to occur in the gap area, particularly when either the cutting tool 10 and/or the workpiece 12 has a complex shape. This pocket 42 will prevent the flow of dielectric fluid through the gap, and the flushing away of eroded particles cannot take place properly, if at all. Or, a pressure can build up in the gap. As a consequence, the impedance of the gap varies without a change in the gap spacing whereupon excessive fluctuations in the gap voltage occur and the operation of the hydraulic servo motor 22 becomes unstable, causing the cutting tool 10 to move back and forth sometimes being too close and other times too far away to effectively machine the workpiece 12. Also, the accumulation of eroded material either because of these gaseous formations or for other reasons can produce these fluctuations. For this purpose, the sensing or detecting system shown generally at 44 is incorporated in the control for the feed mechanism 18. The depicted detecting system 44 includes a gate 46 that controls the input to a counter 48 and a timer 50 connected to the output of the counter 48. The circuits for the gate 46, the counter 48 and the time 50 may be of any known construction, these circuits being well understood by those versed in the art, hence, only the function of each in the detecting system 44 will be mentioned.

The gate 46 is opened and closed at time spaced intervals by a suitable switch which may be, for instance, a multivibrator designated at 52, so that when open the voltage corresponding to that appearing across the gap is applied to the counter 48. The counter 48, during the interval that the gate 46 is open, will count the voltage fluctuations occurring across the gap. If during the opening interval of the gate 46, these fluctuations are of a frequency such that a predetermined number of fluctuations are accumulated on the counter 48, the timer 50 and a relay 54 will be triggered on by the resultant counter output. The relay 54 will in turn open normally closed contacts 54a and interrupt the application of the gap voltage to the summing circuit 30. As explained, the positive reference voltage will dominate and cause the feed mechanism 18 to separate the cutting tool 10 and the workpiece 12. The interval of separation will be determined by the length of time that is required for the timer 50 to time out at which time both the timer 50 and the relay 54 are turned off. This can be accomplished also by the multivibrator 52 if preferred, i.e., the triggering off of the timer 50.

If during the open interval of the gate 46, these fluctuations are of a frequency such that the predetermined number of fluctuations is not accumulated on the counter 48, the counter 48 will be reset to zero count and will await the next open interval of the gate 46. But if a gas pocket does form and/or eroded material accumulates, the resultant excessive fluctuations will cause the timer 50 to be triggered on and cause in the manner just explained the separation of the cutting tool 10 and the workpiece 12.

From the foregoing, it can be seen that by the invention the serious problem of gaseous formations and/or accumulation of eroded material and their effect upon the electrical discharge machining process is solved by the detecting system 44, which operates efficiently and automatically without any attention from the operator. The operation of the detecting system 44 is rapid enough to protect the finish of the workpiece 12 at all times and to dissipate the undesired condition before substantial loss in machining time can occur. Moreover, the machining of complex shapes does not with this detecting system require the careful attention of the operator of the apparatus.

The invention is to be limited only by the following claims.

We claim:

1. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable medium, and means interrupting operation of the apparatus when fluctuations of the gap voltage exceed a predetermined frequency.

2. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable medium, means counting fluctuations of the gap voltage, and means coacting with the counting means for causing the operation of the apparatus to be interrupted when the fluctuations of the gap voltage exceed a predetermined frequency.

3. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable fluid medium, and means separating the electrodes for a predetermined interval adequate to permit an undesired condition between the electrodes to dissipate, the separating means including means responsive to fluctuations of the gap voltage and means causing the electrodes to be separated when the fluctuations exceed a certain frequency.

4. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable fluid medium, means maneuvering the electrodes relative to each other in response to gap voltage, and control means for the maneuvering means, the control means including means responsive to fluctuations of the gap voltage, and means interrupting the application of gap voltage from the maneuvering means when the fluctuations of the gap voltage exceed a certain frequency so as to cause the maneuvering means to separate the electrodes.

5. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable fluid medium, means maneuvering the electrodes relative to each other in response to gap voltage, the maneuvering means being so arranged as to separate the electrodes when the gap voltage is below a certain level, and control means for the maneuvering means, the control means including means responsive to fluctuations of the gap voltage, and means reducing the gap voltage to the maneuvering means when the fluctuations of the gap voltage exceed a certain frequency so that the electrodes are separated for an interval adequate to permit the undesired condition to dissipate.

6. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable fluid medium, a feed mechanism for effecting relative movement between the electrodes in response to gap voltage, the feed mechanism being adapted to separate the electrodes when the gap voltage is below a predetermined level, and means sensing the presence of an undesired condition between the electrodes, the sensing means including a counting circuit for counting fluctuations of the gap voltage for a predetermined interval and developing a corresponding output, and a timing circuit responsive to the output from the counting circuit and operative when the fluctations of the gap voltage exceed a certain frequency to cause the gap voltage supplied to the feed mechanism to be reduced below said predetermined level so that the electrodes will be separated for an interval adequate to permit the undesired condition to dissipate.

7. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable fluid medium, a feed mechanism for effecting relative movement between the electrodes, the feed mechanism including control means and means sensing the presence of an undesired condition betwen the electrodes, the sensing means including a counting circuit arranged to count fluctuations of the gap voltage and to develop a corresponding output, gate means for connecting the counting circuit across the gap for predetermined time spaced intervals, and a timing circuit having the input thereof responsive to the output from the counting circuit and the output thereof operatively connected to the control means so that when the fluctuations of the gap voltage exceed a certain number during said predetermined time spaced intervals the control means will be operative to cause the feed mechanism to separate the electrodes for an interval adequate to permit the undesired condition to dissipate.

8. In electrical stock removal apparatus, the combination of conductive tool and workpiece electrodes spaced apart so as to form a gap therebetween, an energy source applying a certain voltage across the gap for producing time spaced stock removal discharges across the gap in the presence of an ionizable fluid medium, a feed mechanism for effecting relative movement between the electrodes, a feed mechanism control circuit including a reference voltage source, a comparison circuit and switch means operative to connect the comparison circuit across the gap, the comparison circuit being responsive both to a voltage corresponding to average gap voltage and the reference voltage so as to develop a feed mechanism control voltage that is the sum of the reference voltage and the voltage corresponding to the gap voltage, the feed mechanism being arranged so as to maneuver the electrodes relative to each other in response to the feed mechanism control voltage, and means sensing the presence of an undesired condition between the electrodes, the sensing means including a counting circuit connected across the gap so as to count fluctuations of the gap voltage, gate means arranged to connect the counting circuit across the gap for predetermined time spaced intervals, a timing circuit for operating the switch means in response to the output from the counting circuit, the timing circuit being operative when the fluctuations of the gap voltage exceed a certain number during said predetermined time spaced intervals to render the switch means inoperative and thereby disconnect the gap from the comparison circuit so that the resultant feed mechanism control voltage will cause the feed mechanism to separate the electrodes for an interval adequate to permit the undesired condition to dissipate.

9. In the process of electrically removing stock from a conductive workpiece by a conductive electrode, the steps including maneuvering the workpiece and electrode relative to each other so as to form a gap therebetween, supplying an ionizable medium to the gap, applying a certain voltage across the gap so as to effect stock removal from the workpiece, and interrupting the process when fluctuations of the gap voltage attain a predetermined frequency indicating an undesired condition has developed between the electrode and the workpiece.

10. In the process of electrically removing stock from a conductive workpiece by a conductive electrode, the steps including maneuvering the workpiece and the electrode relative to each other so as to form a gap therebetween, supplying an ionizable medium to the gap, applying a certain voltage across the gap so as to effect stock removal from the workpiece, sensing fluctuations of the gap voltage for a predetermined time interval so as to indicate the presence of undesired conditions between the electrode and the workpiece, and interrupting the process when the undesired conditions exist.

11. In the process of electrically removing stock from a conductive workpiece by a conductive electrode, the steps including maneuvering the workpiece and the electrode relative to each other so as to form a gap therebetween, supplying an ionizable fluid medium to the gap, applying a certain voltage across the gap so as to effect stock removal from the workpiece, counting fluctuations of the gap voltage for predetermined time spaced intervals, and interrupting the process when the fluctuations of the gap voltage exceed a certain frequency within one of the said predetermined time spaced intervals.

References Cited in the file of this patent

UNITED STATES PATENTS

| | | |
|---|---|---|
| 2,026,943 | Kennedy et al. | Jan. 7, 1936 |
| 2,807,706 | Oezer | Sept. 24, 1957 |
| 2,882,437 | McKechnie | Apr. 14, 1959 |
| 2,927,191 | Matulaitis | Mar. 1, 1960 |
| 2,951,969 | Matulaitis et al. | Sept. 6, 1960 |
| 3,035,149 | Matulaitis | May 15, 1962 |